D. P. THORPE.
CARRIAGE PROP PIVOT.
APPLICATION FILED MAR. 31, 1910.

1,000,209.

Patented Aug. 8, 1911.

UNITED STATES PATENT OFFICE.

DYER P. THORPE, OF DETROIT, MICHIGAN.

CARRIAGE-PROP PIVOT.

1,000,209.     Specification of Letters Patent.     Patented Aug. 8, 1911.

Application filed March 31, 1910. Serial No. 552,528.

*To all whom it may concern:*

Be it known that I, DYER P. THORPE, a citizen of the United States, residing at Detroit, county of Wayne, State of Michigan, have invented a certain new and useful Improvement in Carriage-Prop Pivots, and declare the following to be a full, clear, and exact description of the same, such as will enable others skilled in the art to which it pertains to make and use the same, reference being had to the accompanying drawings, which form a part of this specification.

This invention relates to carriage prop pivots, and has for its object an improved pivotal stud provided with means for securing the flexible material of the carriage top, leather or fabric, in place, utilizing the same stud as a pivot for the prop of the carriage and threading the ends of the stud to run thereon, the nut which secures the prop in place.

Figure 1:
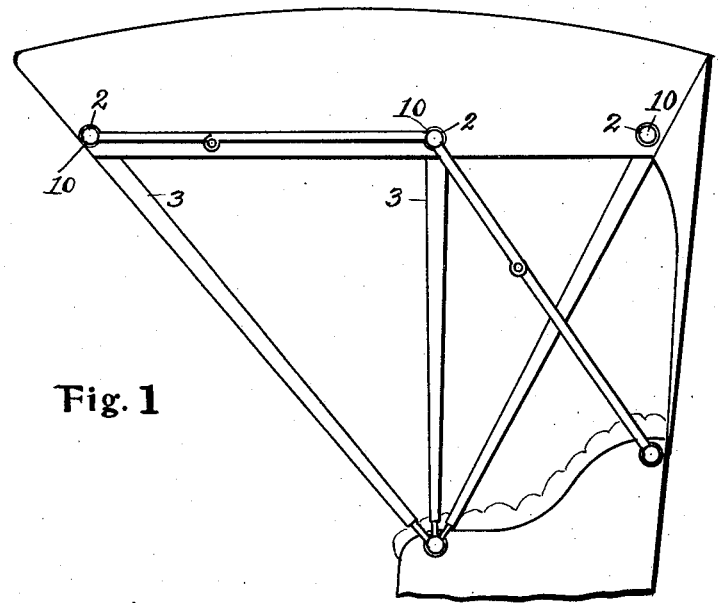
Figure 2:
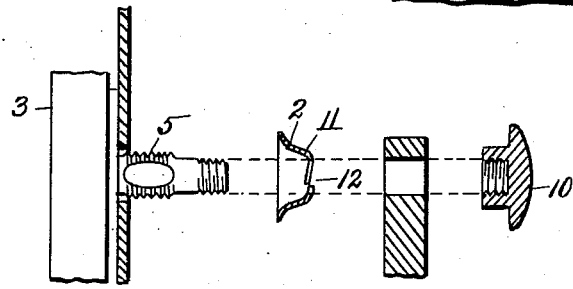
Figure 3:
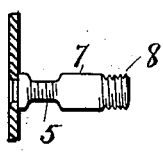
Figure 4:
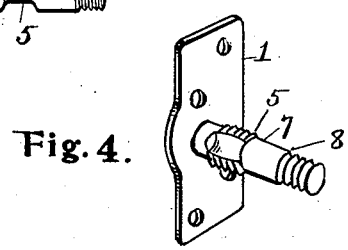
Figure 5:
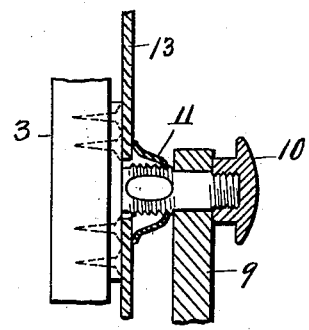

In the drawings:—Figure 1, shows a carriage top showing the location and place of use of the article which embodies the invention. Fig. 2, is a section lengthwise the axis of the stud showing the several parts separated from one another along their extended common axis. Fig. 3, is a longitudinal section showing the stud alone. Fig. 4, is a perspective of the stud and its head. Fig. 5, is a sectional view longitudinal of the axis of the stud showing the parts in their assembled relation.

The embodiment of the invention is shown in Fig. 4, in which 1 indicates the base or head, a plate of metal provided with holes for the insertion therethrough of the screws or nails 2 by means of which the device is secured in place on the carriage bow 3. The stud is secured to the plate preferably by electric welding. A portion of the stud closely adjacent to the plate is swaged to increase one of the diameters, and on this increased diameter a mutilated screw 5 is cut, the screw threads being entirely beyond the ordinary body of the stud. Adjacent to this threaded part, a portion between 7 and 8 is left in its ordinary normal condition and forms the pivotal bearing for the carriage prop 9. The end of the stud beyond the pivotal part is threaded for a nut, preferably a cap nut 10. A dished nut 11, preferably made of sheet metal, having a gage substantially equal to the pitch of the threads in the screw 5 is provided with a central perforation and at one part along the edge of the perforation the metal is notched as at 12 and at one side of the notch the metal is bent inward and at the other outward so that the dished nut will catch on the thread 5 and the dished nut will run on to the screw part 5 as an ordinary nut. The dished nut 11 serves as a light nut with a broad bearing to hold the fabric 13 to the carriage top frame; the pivotal part between 7 and 8 serves as a pivot for the prop 9, and the cap nut 10 secures all the parts together.

What I claim is:—

1. In a carriage pivot joint, the combination of a base plate, a stud having one end anchored therein, its undistorted parts being of uniform cross section and its end adjacent to the plate being swaged to a larger diameter in one direction and having its body portion at each end screw-threaded, a fabric holder adapted to slip over the outer-end threads and to engage the screw-threads adjacent to the plate, and a cap nut adapted to engage the threads at the outer end, substantially as described.

2. A carriage prop pivot, having in combination a base plate, a stud attached thereto, having the end adjacent to said plate swaged and each end screw threaded, whereby the screw-threads on the swaged end are raised above the surface of the other portions of the stud, a sheet metal fabric holder having a central perforation provided with notched edges adapted to engage the swaged screw portion of the stud, and a cap nut engaging the threads on the outer end of said stud.

3. A carriage prop pivot, having in combination a base plate, a cylindrical stud having the end adjacent to said plate swaged and that portion thereof of longest diameter screw-threaded and said stud having the other end of less diameter than the screw-threaded portion of the swaged end, a sheet metal fabric holder having a central perforation adapted to clear the threads on the end of the stud removed from the base plate and provided with notched edges adapted to catch the swage screw portions, and a cap nut of less diameter than the fabric holder and adapted to engage the threaded portion of said screw remote from the base plate, substantially as described.

In testimony whereof, I sign this specification in the presence of two witnesses.

DYER P. THORPE.

Witnesses:
VIRGINIA C. SPRATT,
WILLIAM M. SWAN.

---

Copies of this patent may be obtained for five cents each, by addressing the "Commissioner of Patents, Washington, D. C."